( 12 ) United States Patent
Park et al.

(10) Patent No.: US 10,158,748 B2
(45) Date of Patent: Dec. 18, 2018

(54) MOBILE TERMINAL WITH MULTIPLE DISPLAY MODULES

(71) Applicant: MICROSOFT TECHNOLOGY LICENSING, LLC, Redmond, WA (US)

(72) Inventors: Jun Serk Park, Seoul (KR); Jung Eun Kim, Seoul (KR); Kang Min Kim, Seoul (KR); Min Hun Kang, Seoul (KR)

(73) Assignee: Microsoft Technology Licensing, LLC, Redmond, WA (US)

(*) Notice: Subject to any disclaimer, the term of this patent is extended or adjusted under 35 U.S.C. 154(b) by 85 days.

(21) Appl. No.: 14/788,527

(22) Filed: Jun. 30, 2015

(65) Prior Publication Data

US 2015/0319282 A1 Nov. 5, 2015

Related U.S. Application Data

(63) Continuation of application No. 12/542,534, filed on Aug. 17, 2009, now Pat. No. 9,124,713.

(30) Foreign Application Priority Data

Aug. 22, 2008 (KR) .................. 10-2008-0082467

(51) Int. Cl.
*H04M 1/00* (2006.01)
*H04M 1/725* (2006.01)
*G06F 1/16* (2006.01)

(52) U.S. Cl.
CPC ...... *H04M 1/72522* (2013.01); *G06F 1/1626* (2013.01); *G06F 2200/1637* (2013.01); *H04M 2250/12* (2013.01); *H04M 2250/16* (2013.01)

(58) Field of Classification Search
CPC ......... H04M 2250/16; H04M 2250/54; H04W 52/027; G06F 1/1637; G06F 1/1645; G06F 3/0425
See application file for complete search history.

(56) References Cited

U.S. PATENT DOCUMENTS 5,914,705 A  6/1999  Johnson et al.
7,302,280 B2  11/2007  Hinckley et al.
(Continued)

FOREIGN PATENT DOCUMENTS

CN  101021766  8/2007
EP  1244275  9/2002
(Continued)

OTHER PUBLICATIONS

Korean Intellectual Property Office Application Serial No. 10-2008-0082467, Office Action dated Jul. 30, 2014, 6 pgs.
(Continued)

*Primary Examiner* — Keith Fang

(57) ABSTRACT

A mobile terminal equipped with first and second display modules provided at the front and the rear, respectively, and a method of controlling the mobile terminal, is provided. The method includes displaying a screen image related to a first operating mode on the first display module, if it is determined that the mobile terminal has been rotated on a predetermined axial direction, switching the mobile terminal from the first operating mode to a second operating mode; and displaying a screen image related to the second operating mode on the second display module. Therefore, it is possible to control various operations performed by the mobile terminal upon the motion of the mobile terminal using the first and second display modules.

16 Claims, 13 Drawing Sheets

(56) References Cited

U.S. PATENT DOCUMENTS

| | | | |
|---|---|---|---|
| 8,155,714 B2 | 4/2012 | Allard | |
| 9,124,713 B2 | 9/2015 | Park et al. | |
| 2002/0137551 A1 | 9/2002 | Toba | |
| 2004/0067769 A1 | 4/2004 | King et al. | |
| 2005/0062715 A1* | 3/2005 | Tsuji | G06F 1/162 345/158 |
| 2006/0229118 A1 | 10/2006 | Kaneko | |
| 2006/0242556 A1 | 10/2006 | Koshimizu et al. | |
| 2007/0188450 A1 | 8/2007 | Hernandez et al. | |
| 2007/0191070 A1 | 8/2007 | Rao | |
| 2007/0229517 A1 | 10/2007 | May et al. | |
| 2007/0273609 A1 | 11/2007 | Yamaguchi et al. | |
| 2008/0096611 A1 | 4/2008 | Lee | |
| 2008/0134102 A1 | 6/2008 | Movold et al. | |
| 2008/0161061 A1* | 7/2008 | You | H04M 1/0208 455/566 |
| 2008/0259742 A1 | 10/2008 | Tadanori | |
| 2008/0305775 A1 | 12/2008 | Aaltonen et al. | |
| 2009/0149225 A1* | 6/2009 | Yokota | H04M 1/03 455/575.3 |
| 2010/0283860 A1 | 11/2010 | Nadar | |
| 2010/0289663 A1* | 11/2010 | Savchenko | B60Q 5/008 340/688 |
| 2011/0029870 A1 | 2/2011 | May et al. | |

FOREIGN PATENT DOCUMENTS

| | | |
|---|---|---|
| EP | 1659765 | 5/2006 |
| EP | 1843563 | 10/2007 |
| EP | 1928160 | 6/2008 |
| EP | 1930865 | 6/2008 |
| KR | 10-0753397 | 8/2007 |

OTHER PUBLICATIONS

European Patent Office Application Serial No. 09167911.8, Office Action dated Nov. 26, 2013, 6 pgs.

"Office Action Issued in Chinese Patent Application No. 200910163560.8", dated Sep. 30, 2016, 18 Pages.

"Final Office Action Issued in U.S. Appl. No. 12/542,534", dated Apr. 27, 2012, 18 Pages.

"Final Office Action Issued in U.S. Appl. No. 12/542,534", dated Oct. 24, 2014, 19 Pages.

"Non-Final Office Action Issued in U.S. Appl. No. 12/542,534", dated Jun. 11, 2014, 13 Pages.

"Non-Final Office Action Issued in U.S. Appl. No. 12/542,534", dated Dec. 20, 2011, 19 Pages.

"Notice of Allowance Issued in U.S. Appl. No. 12/542,534", dated Apr. 1, 2015, 13 Pages.

"Response to Non-Final Office Action Filed in U.S. Appl. No. 12/542,534", filed Sep. 3, 2014, 9 Pages.

"Amendment Filed in U.S. Appl. No. 12/542,534", filed Jan. 5, 2015, 1 Page.

"Response to Final Office Action Filed in U.S. Appl. No. 12/542,534", filed Jul. 26, 2012, 9 Pages.

"Response to Non-Final Office Action Filed in U.S. Appl. No. 12/542,534", filed Mar. 20, 2012, 17 Pages.

"Response to Final Office Action Filed in U.S. Appl. No. 12/542,534", filed Dec. 23, 2014, 14 Pages.

"Response to Final Office Action Filed in U.S. Appl. No. 12/542,534", filed May 14, 2014, 8 Pages.

"Notice of Reexamination Issued in Chinese Patent Application No. 200910163560.8", dated May 18, 2016, 12 Pages.

* cited by examiner

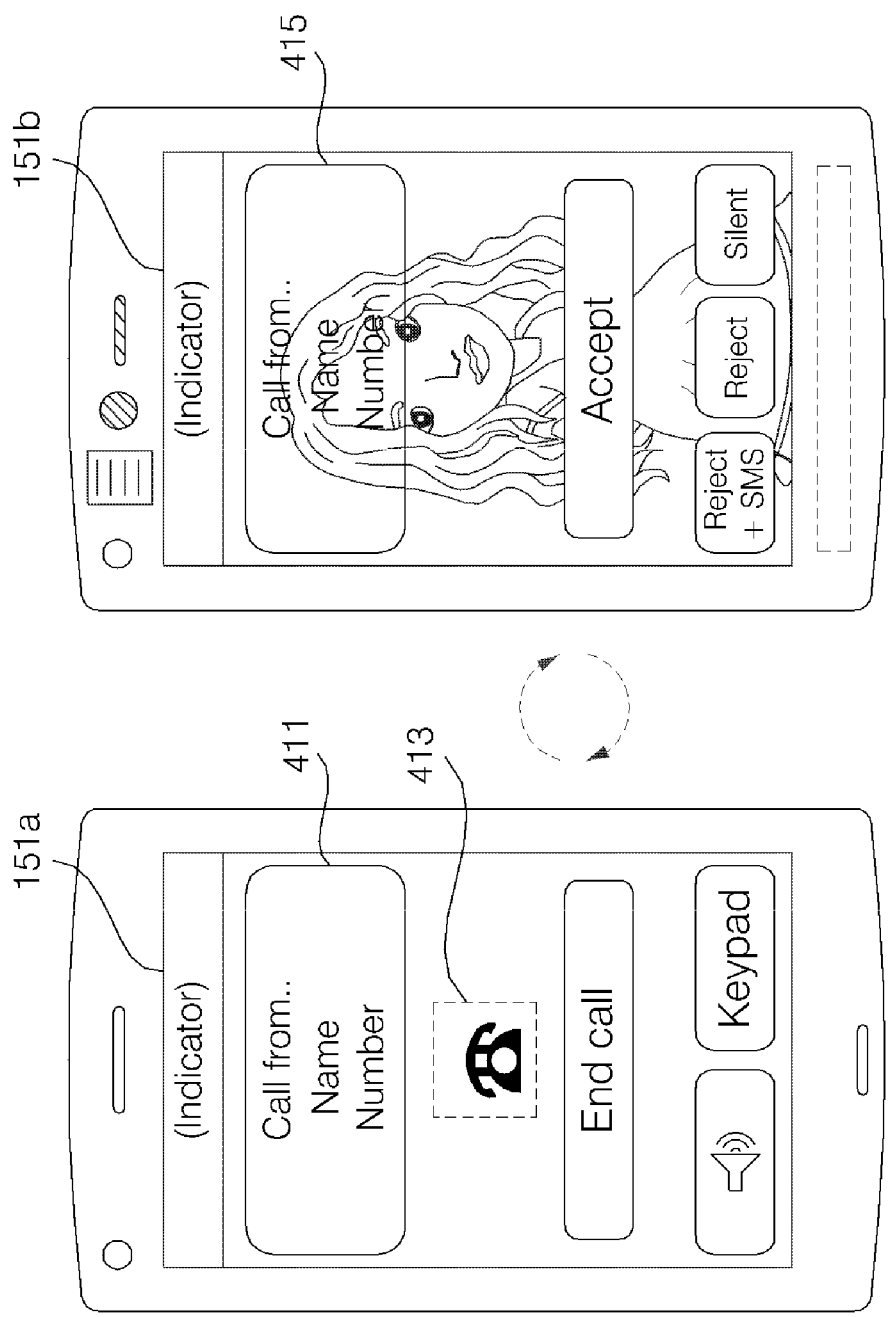

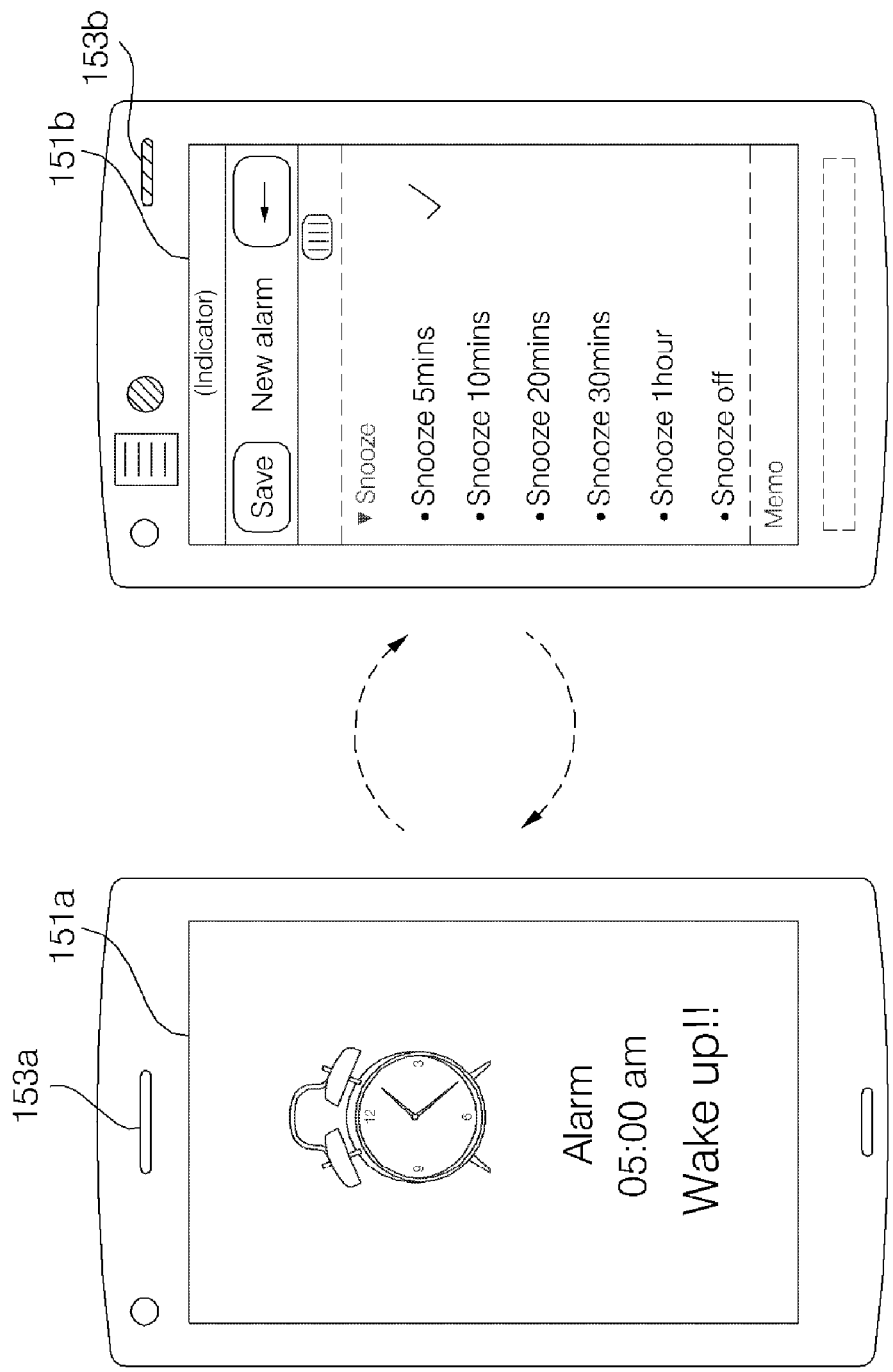

MOBILE TERMINAL WITH MULTIPLE DISPLAY MODULES

CROSS-REFERENCE TO RELATED APPLICATION

This application is a continuation of U.S. patent application Ser. No. 12/542,534 (now U.S. Pat. No. 9,124,713), filed on Aug. 17, 2009, which claims the benefit of earlier filing date and right of priority to Korean Patent Application No. 10-2008-0082467, filed on Aug. 22, 2008, the contents of which are all hereby incorporated by reference herein in their entirety.

BACKGROUND OF THE INVENTION

1. Field of the Invention

The present invention relates to a mobile terminal capable of controlling various operations according to the motion of a main body of the mobile terminal by using two display modules having different properties and a method of controlling the mobile terminal.

2. Description of the Related Art

Mobile terminals are portable devices that can provide users with various services, such as a voice calling service, a video calling service, an information input or output service, and a data storage service. As the types of services provided by mobile terminals diversify, an increasing number of mobile terminals are equipped with various complicated functions, such as capturing photos or moving pictures, playing music files or moving image files, providing game programs, receiving broadcast programs and providing wireless Internet services. These mobile terminals have thus evolved into multimedia players.

Various attempts have been made to realize such complicated functions through hardware devices or software programs. For example, various user interface (UI) environments have been developed that allow users to easily search for and choose desired functions. In addition, the demand for various designs for mobile terminals, such as a double-sided liquid crystal display (LCD) or a full touch screen, has steadily grown due to a growing perception of considering mobile terminals as not merely functional devices, but as personal items that can represent personal individuality.

However, there is a restriction in allocating sufficient space for a UI (such as a display device or a keypad) of a mobile terminal without compromising the mobility and the portability of a mobile terminal. In addition, mobile terminals are generally required to provide high power efficiency. Therefore, in order to efficiently use various functions provided by a mobile terminal, it is necessary to develop ways to efficiently use the space of a mobile terminal and control the operation of a mobile terminal using a UI capable of improving the power efficiency of a mobile terminal.

SUMMARY OF THE INVENTION

A mobile terminal is provided that is capable of controlling various operations according to the motion of a main body of the mobile terminal by using a plurality of display modules, such as a touch screen and electronic paper (e-paper). A method of controlling the mobile terminal is also provided.

According to an aspect of the present invention, there is a method of controlling a mobile terminal that includes displaying a first indicator on a first display of the mobile terminal during a first state, changing the state of the mobile terminal from the first state to a second state, and displaying a second indicator on a second display of the mobile terminal during the second state. The changing of the state of the mobile terminal occurs in response to a main body of the mobile terminal being rotated more than ninety degrees in a predetermined axial direction. The first indicator and the second indicator each relate to an operational function of the mobile terminal.

According to another aspect of the invention, there is a mobile terminal that includes a first display positioned on a first side of a main body, a second display positioned on a second side of the main body, opposite the first side of the main body, an acceleration sensor configured to measure a direction of gravitational acceleration, and a controller configured to change the state of the mobile terminal from a first state to a second state in response to measurement data provided by the acceleration sensor. The first display is configured to display a first indicator, which relates to an operational function of the mobile terminal, during the first state of the mobile terminal. The second display is configured to display a second indicator, which relates to the operational function of the mobile terminal, during the second state of the mobile terminal. The controller changes the state of the mobile terminal upon receiving measurement data from the acceleration sensor that indicates that the main body of the mobile terminal has been rotated more than ninety degrees in a predetermined axial direction.

BRIEF DESCRIPTION OF THE DRAWINGS

The above and other features and advantages of the present invention will become more apparent by describing in detail embodiments thereof with reference to the attached drawings in which:

FIGS. 7A, 7B, 8A, 8B, 9A, 9B, 10A, 10B, 11A, 11B, 12A, and 12B illustrate diagrams for explaining the methods of FIGS. 4, 5, 6A, and 6B.

DETAILED DESCRIPTION OF THE INVENTION

The present invention will hereinafter be described in detail with reference to the accompanying drawings in which exemplary embodiments of the invention are shown.

The term "mobile terminal," as used herein, may indicate a mobile phone, a smart phone, a laptop book computer, a digital broadcast receiver, a personal digital assistant (PDA), a portable multimedia player (PMP), or a navigation device. The terms "module" and "unit," as used herein, may be used interchangeably.

Figure 1:
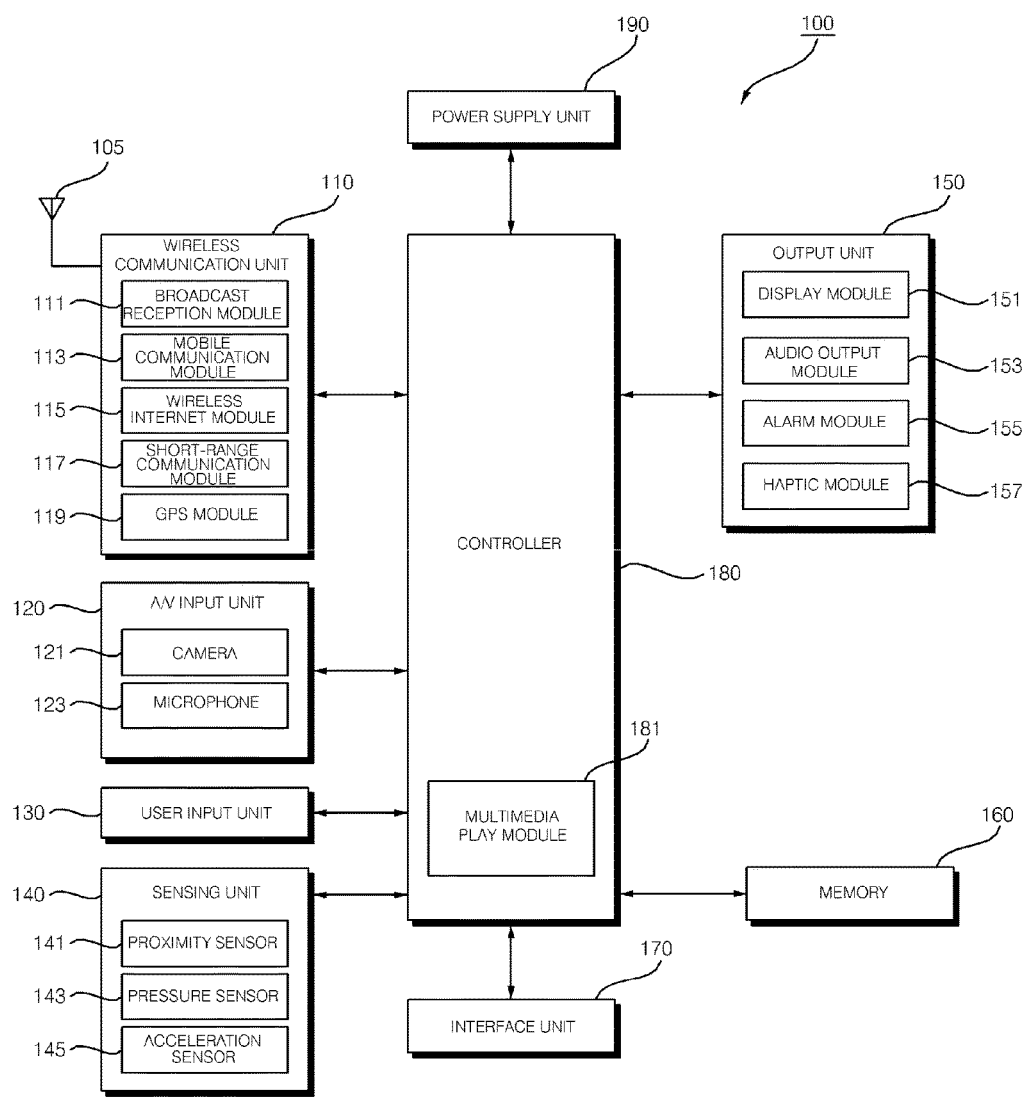
FIG. 1 illustrates a block diagram of a mobile terminal.

FIG. 1 illustrates a block diagram of a mobile terminal 100. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190.

Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit. Alternatively, some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless Internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server that generates broadcast signals and/or broadcast-related information and transmits the generated broadcast signals and/or the generated broadcast-related information.

The broadcast management server may also be a server that receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111.

The broadcast-related information may come in various forms. For example, the broadcast-related information may be an electronic program guide (EPG) of digital multimedia broadcasting (DMB) or may be an electronic service guide (ESG) of digital video broadcast-handheld (DVB-H).

The broadcast reception module 111 may receive the broadcast signal using various broadcasting systems, such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receive wireless signals from at least one of a base station, an external terminal, and a server through a mobile communication network. The wireless signals may include various types of data according to whether the mobile terminal 100 transmits or receives voice call signals, video call signals, or text or multimedia messages.

The wireless Internet module 115 may be a module for wirelessly accessing the Internet. The wireless Internet module 115 may be embedded in the mobile terminal 100 or may be installed in an external device. The wireless Internet module 115 may use various wireless Internet techniques, such as wireless fidelity (WiFi), wireless broadband (Wibro), world interoperability for microwave access (Wimax) or high-speed downlink packet access (HSDPA).

The short-range communication module 117 may be a module for short-range communication. The short-range communication module 117 may use various short-range communication techniques, such as Bluetooth®, radio frequency identification (RFID), infrared data association (IrDA), ultra wideband (UWB), and ZigBee®.

The GPS module 119 may receive position information from a plurality of GPS satellites.

The A/V input unit 120 may be used to receive audio signals or video signals. The A/V input unit 120 may include a camera 121 and a microphone 123.

The camera 121 may process various image frames, such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external audio signals during a call mode, a recording mode, or a voice recognition mode with the use of a microphone and may convert the audio signals into electrical audio data. In the call mode, the mobile communication module 113 may convert the electrical audio data into data that can be readily transmitted to a mobile communication base station and then output the data obtained by the conversion. The microphone 123 may use various noise removal algorithms to remove noise that may be generated during the reception of external audio signals.

The user input unit 130 may generate key input data based on user input for controlling the operation of the mobile terminal 100. The user input unit 130 may be implemented as a keypad, a dome switch, a touch pad (either static pressure or static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100, such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143, and an acceleration sensor 145. The sensing unit 140 may include two or more proximity sensors 141.

The proximity sensor 141 may determine whether there is an entity nearby and approaching the mobile terminal 100 without any mechanical contact with the entity. More specifically, the proximity sensor 141 may detect an entity that is nearby and approaching by detecting a change in an alternating magnetic field or the rate of change of static capacitance.

The pressure sensor 143 may determine whether pressure is being applied to the mobile terminal 100 and may detect the magnitude of pressure applied to the mobile terminal 100. The pressure sensor 143 may be installed in a portion of the mobile terminal 100 in which the detection of pressure is necessary.

For example, the pressure sensor 143 may be installed in the display module 151. In this case, the display module 151 may differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

Acceleration sensors are a type of device for converting an acceleration variation into an electric signal. With recent developments in micro-electromechanical system (MEMS) technology, acceleration sensors have been widely used in various products for various purposes.

For example, an acceleration sensor may be installed in an airbag system for an automobile and may thus be used to detect collisions. Alternatively, an acceleration sensor may be used as an input device for a computer game and may sense the motion of the human hand during a computer game.

Two or three acceleration sensors 145 representing different axial directions may be installed in the mobile terminal 100. Alternatively, only one acceleration sensor 145 representing a Z axis may be installed in the mobile terminal 100.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller.

The touch screen panel is a transparent panel attached onto the exterior of the mobile terminal 100 and may be connected to an internal bus of the mobile terminal 100. The touch screen panel keeps monitoring whether the touch screen panel is being touched by a user.

Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties.

E-paper may be implemented on any type of substrate, such as a plastic, metallic or paper substrate, and may maintain an image displayed thereon even when power is cut off. In addition, e-paper may be able to reduce the power consumption of the mobile terminal 100 because it does not require a backlight assembly.

The display module 151 may be implemented as e-paper by using electrostatic-charged hemispherical twist balls, electrophoretic deposition, or microcapsules. Forms of electronic media, such as these and any similar technologies, will be collectively referred to as "electronic paper" throughout the remainder of this disclosure.

Electronic paper technologies generally require that power be applied to generate the electric field for creating or altering the image shown on the visual display. The generated image may be static until another electric field is applied. This reduced, intermittent power requirement is beneficial for use in disclosed embodiments discussed below. As will be appreciated by one of skill in the art, media incorporating material that can be magnetically manipulated in similar manner as the electronic paper described above can also be used as the updateable visual display as discussed herein.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode, or may output audio data present in the memory 160. In addition, the audio output module 153 may output various audio signals associated with the functions of the mobile terminal 100, such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal.

More specifically, the alarm module 155 may output a signal upon receiving a call signal or a message. In addition, the alarm module 155 may receive a key signal and may output a signal as feedback to the key signal.

Therefore, the user may be able to determine whether an event has occurred based on an alarm signal output by the alarm module 155. An alarm signal for notifying the user of the occurrence of an event may be output not only by the alarm module 155 but also by the display module 151 and/or the audio output module 153.

The haptic module 157 may provide various haptic effects (such as vibrations) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data, such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and/or a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired or wireless headset, an external battery charger, a wired or wireless data port, a card socket for, for example, a memory card, a subscriber identification module (SIM) card or a user identity module (UIM) card, an audio input/output (I/O) terminal, a video I/O terminal, or an earphone.

The interface unit 170 may receive data from an external device or may be powered by an external device. The interface unit 170 may transmit data provided by an external device to other components in the mobile terminal 100 or may transmit data provided by other components in the mobile terminal 100 to an external device.

If the mobile terminal 100 is connected to an external cradle, power may be supplied from the external cradle to the mobile terminal through the interface unit 170. Various command signals may be transmitted from the external cradle to the mobile terminal through the interface unit 170.

The controller 180 may control the general operation of the mobile terminal 100. For example, the controller 180 may perform various control operations regarding making or receiving a voice call, transmitting or receiving data, or making or receiving a video call. The controller 180 may include a multimedia play module 181, which plays multimedia data.

The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The mobile terminal 100 may include a wired or wireless communication system and a satellite-based communication system. The mobile terminal 100 may be configured to operate in a communication system transmitting data as frames or packets.

The exterior of the mobile terminal 100 will hereinafter be described in detail with reference to FIGS. 2 and 3. For convenience, it is assumed that the mobile terminal 100 is a bar-type mobile phone equipped with a full touch screen. However, the present invention is not restricted to a bar-type mobile phone. Rather, the present invention can be applied to various mobile phones, other than a bar-type mobile phone, for example, a folder-type mobile phone, a swing-type mobile phone and a slider-type mobile phone.

Figure 2:
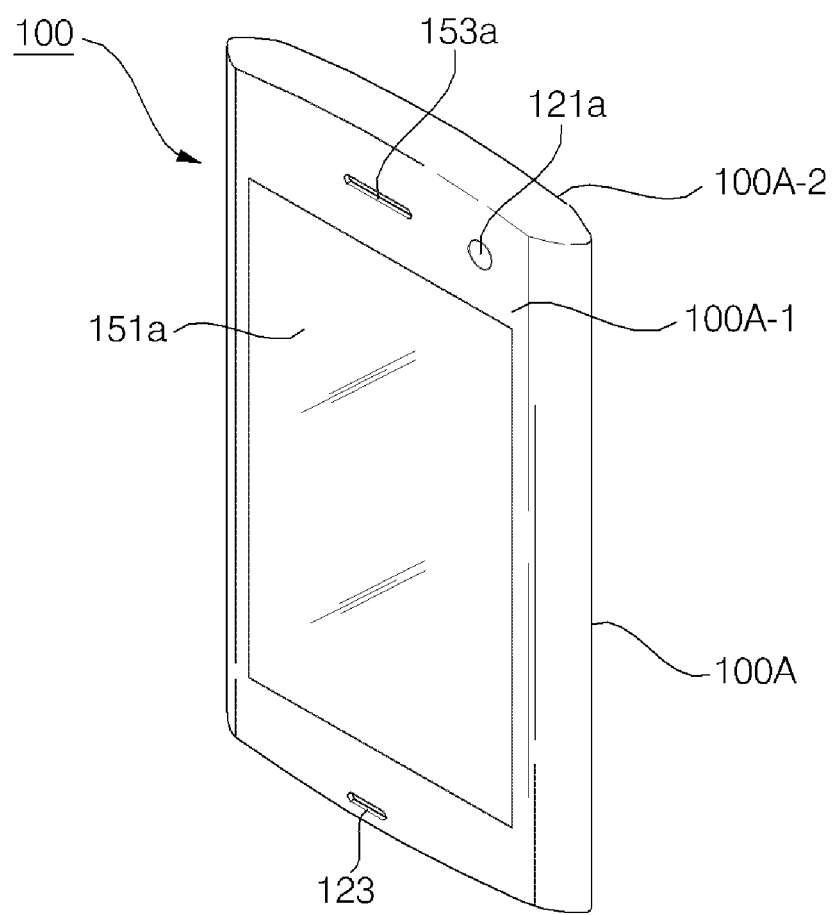
FIG. 2 illustrates a front perspective view of the mobile terminal shown in FIG. 1.

FIG. 2 illustrates a front perspective view of the mobile terminal 100 shown in FIG. 1. Referring to FIG. 2, the exterior of the mobile terminal 100 may be defined by a front case 100A-1 and a rear case 100A-2. Various electronic products may be installed in the empty space between the front case 100A-1 and the rear case 100A-2. At least one intermediate case may be additionally disposed between the front case 100A-1 and the rear case 100A-2.

The front case 100A-1 and the rear case 100A-2 may be formed of a synthetic resin through injection molding. Alternatively, the front case 100A-1 and the rear case 100A-2 may be formed of a metal, such as stainless steel (STS) or titanium (Ti).

A first display, such as first display module 151*a*, a first audio output module 153*a*, a first camera 121*a* and a user input unit (not shown) may be located in the front case 100A-1. The first display module 151*a* and a second display, such as a second display module 151*b*, may be LCDs, OLEDs or e-paper that can visualize information.

Since a touch pad is configured to overlap the first and second display modules 151*a* and 151*b* and thus to realize a layer structure, the first and second display modules 151*a* and 151*b* may serve as touch screens. Thus, it is possible for a user to input information to the first and second display modules 151*a* and 151*b* simply by touching the first and second display modules 151*a* and 151*b*.

The first audio output module 153*a* may be implemented as a receiver or a speaker. The first camera 121*a* may be configured to capture a still image or a moving image of a user. The microphone 123 may be configured to properly receive the voice of a user or other sounds.

The user input unit 130 may adopt various manipulation methods as long as it can offer tactile feedback to a user. For example, the user input unit 130 may be implemented as a dome switch or a touch pad that receives a command or information upon being pushed or touched by a user. Alternatively, the user input unit 130 may be implemented as a wheel, a jog dial, or a joystick.

The user input unit 130 may allow a user to input such commands as "start," "end," and "scroll" and to choose an operating mode. The user input unit 130 may also serve as a hot key for activating certain functions of the mobile terminal 100.

Figure 3:
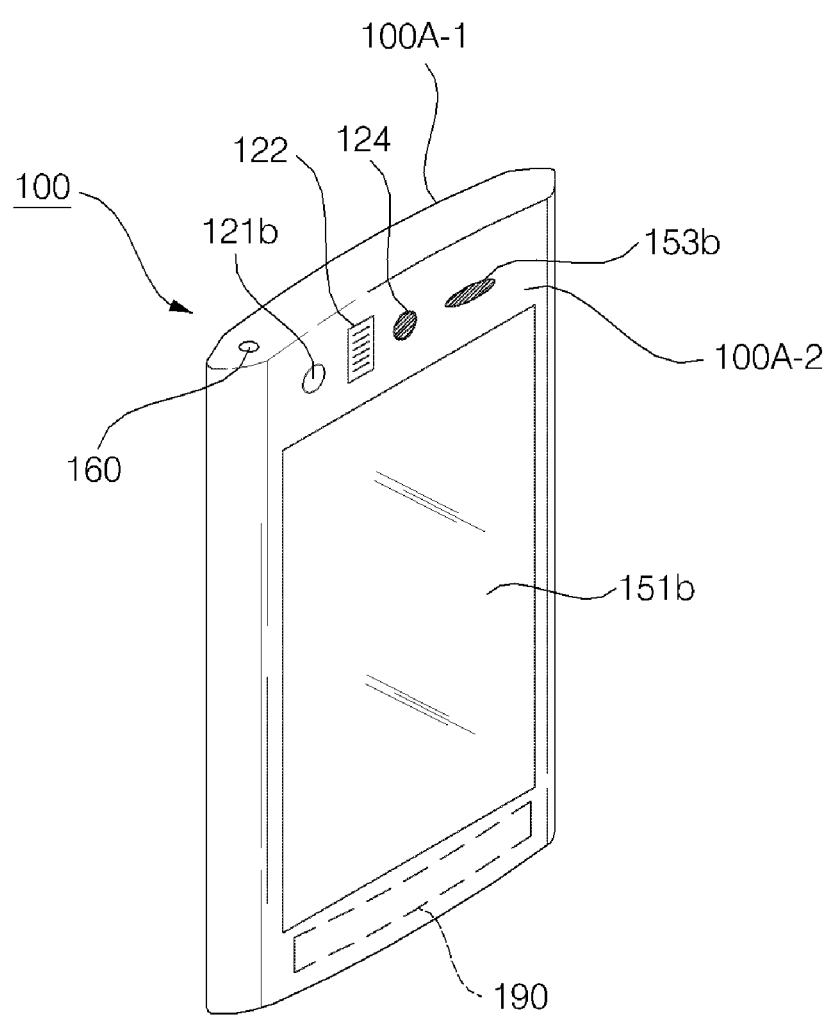
FIG. 3 illustrates a rear perspective view of the mobile terminal shown in FIG. 1.

FIG. 3 illustrates a rear perspective view of the mobile terminal 100 shown in FIG. 2. Referring to FIG. 3, an interface unit (not shown) may be located in the rear case 100A-2. A second camera 121*b* may be disposed at the rear case 100A-2.

The second camera 121*b* may have a different photographing direction from that of the first camera 121*a* shown in FIG. 2. In addition, the number of pixels of the second camera 121*b* may be different from the number of pixels of the first camera 121*a*.

For example, the first camera 121*a* may be used to capture an image of the face of a user and then readily transmit the captured image during a video call. Thus, a low-pixel camera may be used as the first camera 121a.

The second camera 121b may be used to capture an image of an ordinary subject. Given that images captured by the second camera 121b generally do not need to be transmitted, a high-pixel camera may be used as the second camera 121b.

A camera flash 122 and a mirror 124 may be located near the second camera 121b. The user may look in the mirror 124 for taking a self shot. The camera flash 125 may illuminate a subject when the second camera 121b captures an image of the subject.

A second audio output module 153b may be additionally provided in the rear case 100A-2. The second audio output module 153b may realize a stereo function along with the first audio output module 153a. The second audio output module may also be used during a speaker-phone mode.

An antenna 160 for receiving a broadcast signal may be disposed on one side of the rear case 100A-2. The antenna 160 may be installed be pulled out of the rear case 100A-2.

A power supply unit 190 may be disposed in the rear case 100A-2. The power supply unit 190 may be a rechargeable battery and may be coupled to the rear case 100A-2 such that it can be attachable to or detachable from the rear case 100A-2.

The second camera 121b is illustrated in FIG. 3 as being disposed in the rear case 100A-2, but the present invention is not restricted to this. In addition, the first camera 121a may be able to rotate and thus to cover the photographing direction of the second camera 121b. In this case, the second camera 121b may be optional.

Figure 4:
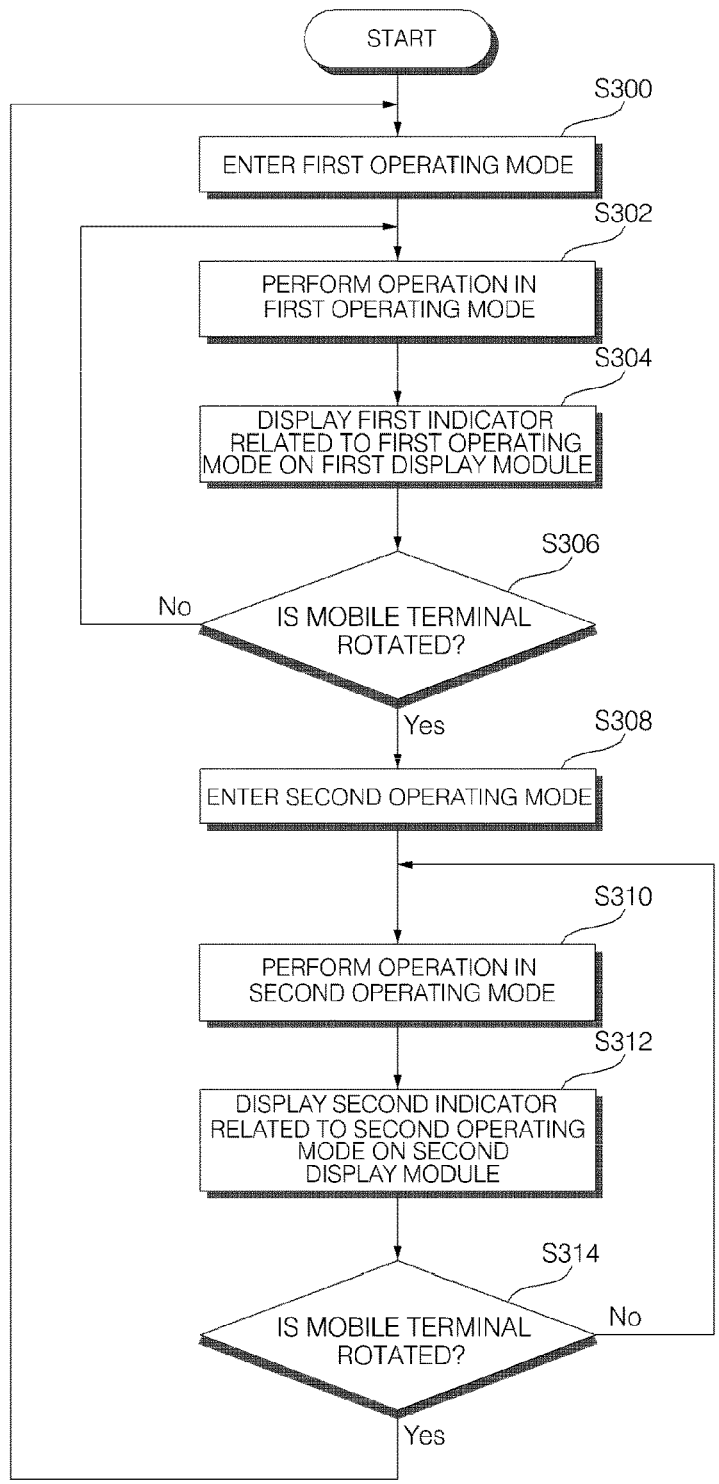
FIG. 4 illustrates a flowchart of a method of controlling a mobile terminal.

FIG. 4 illustrates a flowchart of a method of controlling the operation of a mobile terminal. The first display module 151a may be a touch screen, and the second display module 151b may be e-paper.

E-paper can provide as high resolution as ordinary ink on paper, wide viewing angles, and excellent visual properties. E-paper and can maintain an image displayed thereon even when power is cut off.

Therefore, it is possible to control various operations performed by the mobile terminal 100 by selectively using the first display module 151a, which can display color images, and the second display module 151b, which may display a black-and-white image, and is capable of maintaining an image displayed thereon and consumes less power than the first display module 151a. In addition, the mobile terminal 100 may perform similar functions to those of a double-sided display by using the first display module 151a, which is disposed on the front case 100A-1 of the mobile terminal 100, and the second display module 151b, which is disposed at the rear case 100A-2 of the mobile terminal 100.

With continued reference to FIG. 4, the controller 180 may place the mobile terminal 100 in a first state, or operating mode (S300). Thereafter, the controller 180 may control a first operation chosen in response to an input, such as a user command, to be performed (S302).

Thereafter, the controller 180 may display a first indicator related to the first state, such as a screen image displaying progress in the first operation, a screen image displaying the result of the first operation, and a screen image (e.g., a menu screen) for choosing one of a number of operations corresponding to the first state, on the first display module 151a (S304). The first state relates to an operational function of the mobile terminal.

Operations S300 through S304 may be performed repeatedly until the rotation of the mobile terminal 100 is detected. The acceleration sensor 145 may be used to detect rotation of the mobile terminal 100. If measurement data provided by the acceleration sensor 145 indicates that the mobile terminal 100 has been rotated more than ninety degrees in a predetermined axial direction of the first display module 151a (S306), the controller 180 may place the mobile terminal 100 in a second state, or operating mode (S308). The predetermined axial direction may be parallel to one of a longitudinal direction and a lateral direction of the first display module 151a, so that the rear case 100A-2 of the mobile terminal 100 can face up. The controller 180 may thus control a second operation chosen in response to input, such as a user command, to be performed (S310).

Thereafter, the controller 180 may display a second indicator related to the second operating mode, such as a screen image displaying progress in the second operation, a screen image displaying the result of the second operation, and a screen image (e.g., a menu screen) for choosing one of a number of operations corresponding to the second operating mode, on the second display module 151a (S312). The second state relates to an operational function of the mobile terminal.

The second operating mode may be an operating mode set in advance in response to an input, such as a user command, an operating mode determined based on the properties of the first and second display modules 151a and 151b, or an operating mode associated with an event that has occurred during the first operating mode. For example, the first operating mode may be a color mode, and the second operating mode may be a black-and-white mode. If the mobile terminal 100 was performing an operation when switched from the first operating mode to the second operating mode, the operation may be terminated, or may continue to be performed in a background mode.

Operations S308 through S312 may be performed repeatedly until the rotation of the mobile terminal 100 is detected again. If the rotation of the mobile terminal 100 is detected during the second operating mode (S314), the method returns to operation S300, and the controller 180 may place the mobile terminal 100 back in the first operating mode. In this case, if the mobile terminal 100 was performing an operation when switched from the second operating mode to the first operating mode, the operation may be terminated, or may continue to be performed in a background mode.

In this manner, it is possible to efficiently switch the mobile terminal from one state, or operating mode, to another state, or operating mode, according to the motion of the mobile terminal 100, such as rotation, and display an indicator related to the results of the switching on one of the first and second display modules 151a and 151b.

Figure 5:
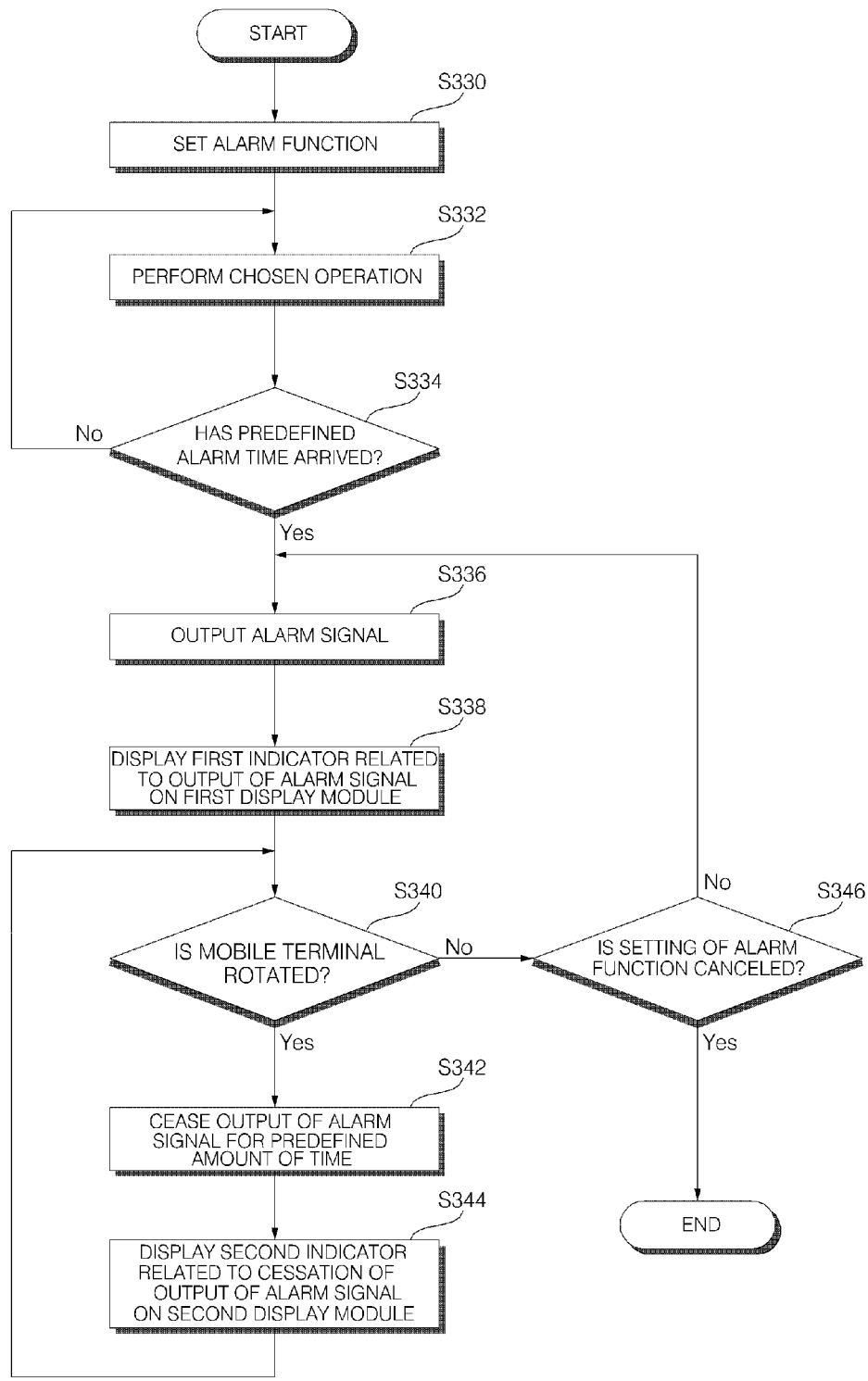
FIG. 5 illustrates a flowchart of a method of controlling a mobile terminal.

FIG. 5 illustrates a flowchart showing how to control the operation of the mobile terminal 100 using the first and second display modules 151a and 151b As illustrated in FIG. 5, the controller 180 controls the operation of the mobile terminal 100 upon the rotation of the mobile terminal, when an alarm function is set.

While an alarm function is set (S330), the controller 180 may perform a chosen operation (S332). After the alarm function is set (S330), the controller 180 may determine whether a predefined alarm time has arrived (S334). If it is determined in operation S334 that the predefined alarm time has arrived, the controller 180 may control the alarm module 155 to output an alarm signal (S336), and may display a first indicator related to the output of the alarm signal on the first display module 151a (S338) during the first state of the mobile terminal.

At least one of an audio signal, light and vibration may be output as the alarm signal. If an audio signal is output as the alarm signal, the alarm signal may be output by the first audio output module 153*a* disposed at the front case 100A-1 the mobile terminal 100.

Thereafter, if measurement data provided by the acceleration sensor 143 indicates that the mobile terminal 100 has been rotated about the axis of the first display module 151*a* (S340), the controller 180 may change the state of the mobile terminal from the first state to the second state, and cease the output of the alarm signal for a predefined amount of time (S342). The axis may be parallel to one of the longitudinal direction or the lateral direction of the first display module 151*a*, so that the rear case 100A-1 of the mobile terminal 100 can face up. That is, an alarm snooze function may be performed upon the rotation of the mobile terminal 100. The predefined amount of time for which the output of the alarm signal is ceased may be determined in response to an input to the mobile terminal 100, such as a user command.

The controller 180 may display a second indicator related to ceasing the output of the alarm signal on the second display module 151*b* (S344) during the second state of the mobile terminal 100. Once the output of the alarm signal is resumed, the alarm signal may be output by the second audio output module 153*b* located on the rear case 100 A-2 of the mobile terminal 100.

Operations S336 through S344 may be performed repeatedly until the setting of an alarm function is canceled (5346). In this manner, it is possible to perform an alarm snooze function upon the rotation of the mobile terminal 100 and display a screen image regarding the alarm snooze function using one of the first and second display modules 151*a* and 151*b*.

Figure 6A:
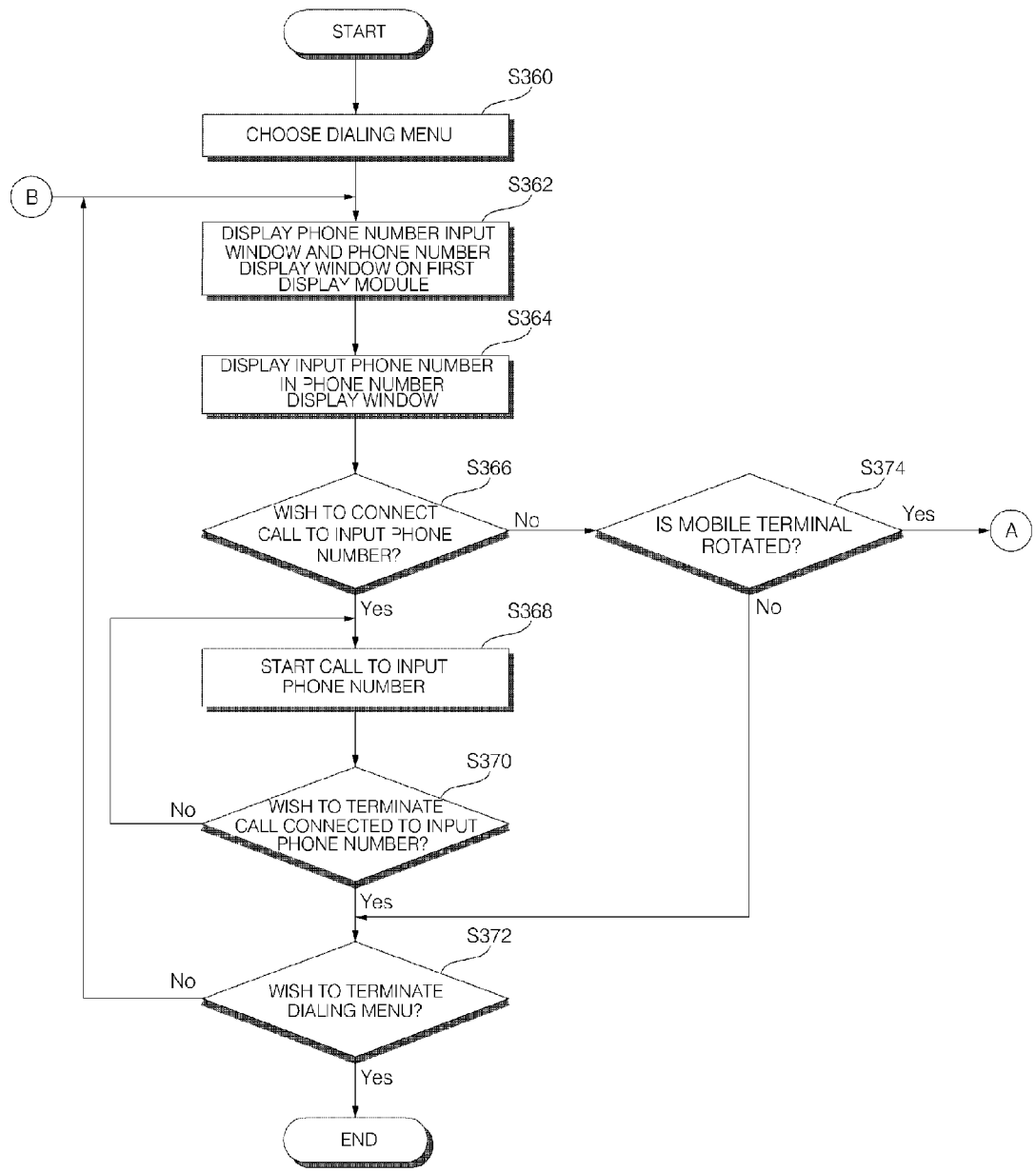
FIGS. 6A and 6B illustrate flowcharts of a method of controlling a mobile terminal.
Figure 6B:
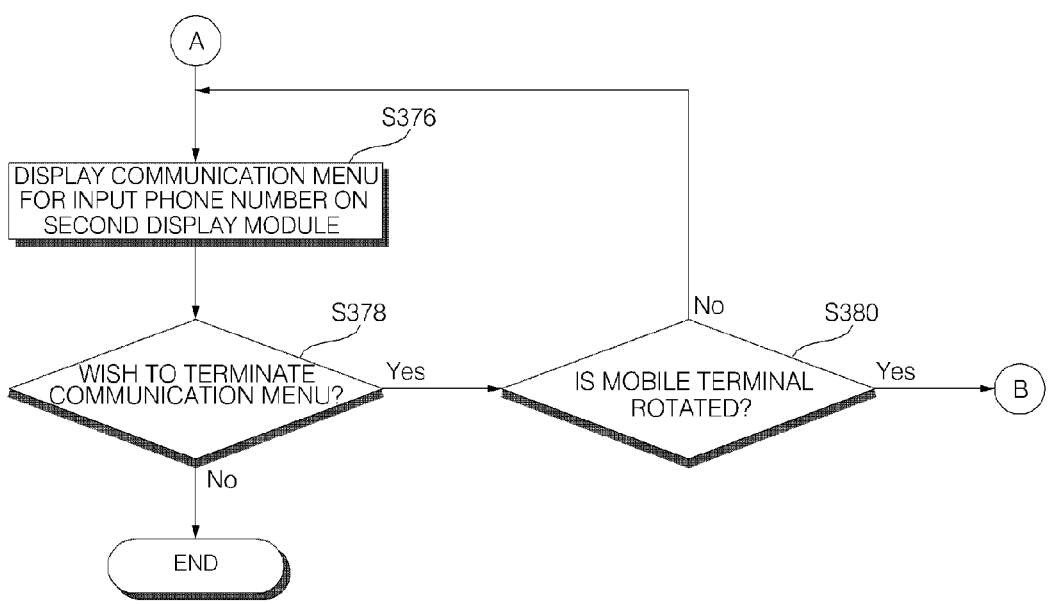

FIGS. 6A and 6B illustrate a flowchart showing how to control the operation of the mobile terminal 100, using the first and second display modules 151*a* and 151*b*. As illustrated in FIGS. 6A and 6B, the controller 180 controls the operator of the mobile terminal 100 upon the rotation of the mobile terminal, when a dialing menu is executed.

If a dialing menu for making a call or sending a message is chosen in response to an input, such as a user command (S360), during the first state of the mobile terminal 100, the controller 180 may display a phone number input window and a phone number display window on the first display module 151*a* (S362). Thereafter, the controller 180 may display a first indicator, such as a phone number, input to the phone number input window in the phone number display window (S364).

Thereafter, if the user chooses to make a call to the input phone number (S366), the controller 180 may control the wireless communication unit 110 to start a call to the input phone number (S368). Operation S368 may continue until the user wishes to terminate the call to the input phone number (S370).

If the user chooses to terminate the dialing menu (S372), the method ends. On the other hand, if the user chooses not to terminate the dialing menu (S372), the method returns to operation S362.

If the user chooses not to make a call to the input phone number (S366), the controller 180 may determine whether the mobile terminal 100 has been rotated (S374) to change the mobile terminal from the first state to the second state. If measurement data provided by the acceleration sensor 143 indicates that the mobile terminal 100 has been rotated about the axis of the first display module 151*a*, (S374), the controller 180 may display on the second display module 151*b* a second indicator, such as a communication menu, other than making a call, such as a menu for sending a message, a menu for sending a file or a menu for making a video call using the second display module 151*b* (S376). The axis may be parallel to one of the longitudinal direction or the lateral direction of the first display module 151*a*, so that the rear surface of the mobile terminal 100 can face up.

The communication menu is related to the input phone number. The controller 180 may perform an operation corresponding to a specific menu item on the communication menu.

If the user chooses to terminate the communication menu (S378), the controller 180 may determine whether the mobile terminal 100 has been rotated again (S380) to change the mobile terminal from the second state to the first state. If it is determined in operation S380 that the mobile terminal 100 has been rotated again, the method returns to operation S362. On the other hand, if it is determined in operation S380 that the mobile terminal 100 has not been rotated again, the method returns to operation S376.

If another call is received during the execution of a call, or a predefined event occurs, the controller 180 may display a screen image regarding the first call on the first display module 151*a* and may display information related to the second call or the predefined event on the second display module 151*b*.

In this manner, it is possible to efficiently determine whether to connect a call or execute a communication menu, other than connecting a call, upon the rotation of the mobile terminal 100 when a phone number is received and display a screen image indicating the results of the determination on one of the first and second display modules 151*a* and 151*b*.

FIGS. 7A, 7B, 8A, 8B, 9A, 9B, 10A, 10B, 11A, 11B, 12A, and 12B illustrate diagrams for explaining the methods described in FIGS. 4, 5, 6A, and 6B.

Figure 7B:
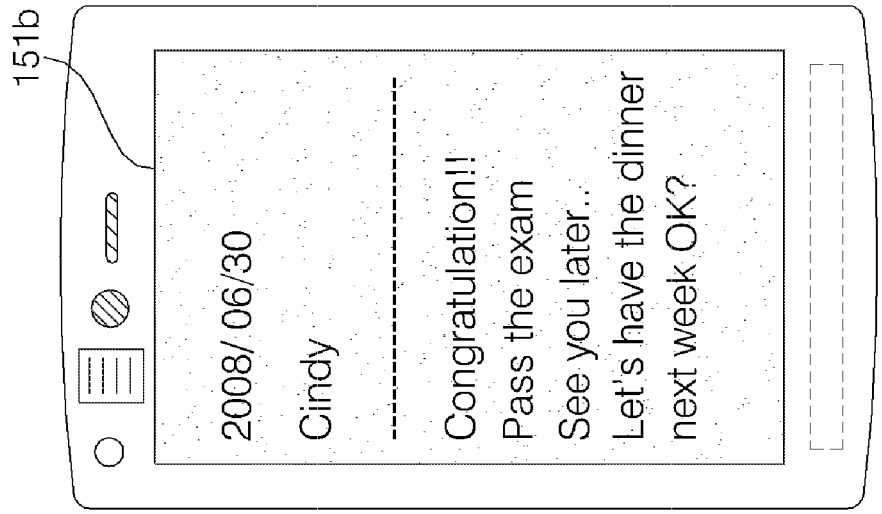
Figure 7A:
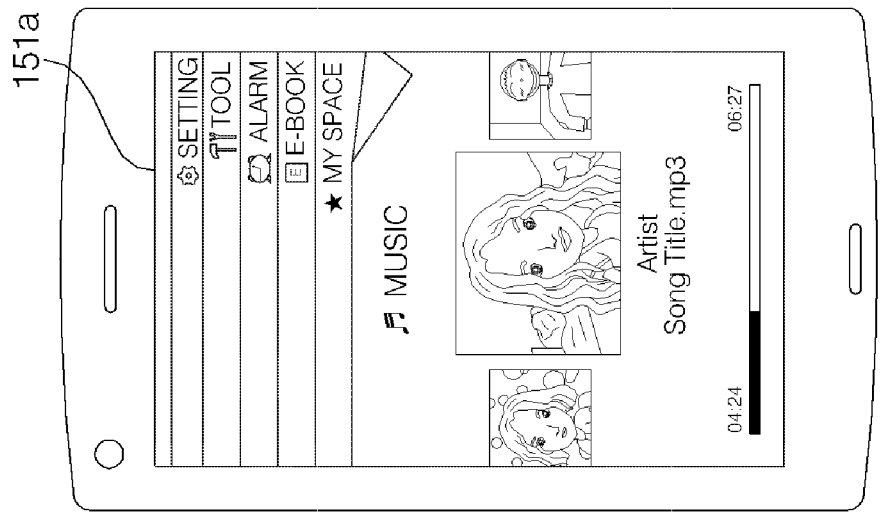

Referring to FIG. 7A, a multimedia play screen may be displayed on the first display module 151*a*. In this case, if the mobile terminal 100 is rotated so that the second display module 151*b* can face up, a predetermined operating mode such as a mode for editing a document may be executed, and a screen image related to the predetermined operating mode may be displayed on the second display module 151*b*, as shown in FIG. 7B. The predetermined operating mode may be an operating mode set in advance by the user or an operating mode determined automatically in response to the occurrence of a predefined event.

Referring to FIG. 8A, a voice call screen may be displayed on the first display module 151*a*. Caller information 411 regarding the caller of a first call who is currently having a phone conversation with the user may be displayed on the voice call screen. If a request for a second call is received during the first call, an icon 413 indicating that there is a request for another call may be displayed on the voice call screen.

Thereafter, if the mobile terminal 100 is rotated when a request for the second call is received, a screen image related to the second call may be displayed on the second display module 151*b*, as shown in FIG. 8B. Caller information 415 regarding the caller of the second call may be displayed on the second display module 151*b*. Thus, the user may decide whether to accept the second call based on the caller information 415. Alternatively, if the mobile terminal 100 is rotated when a request for the second call is received, the user may be automatically connected to the second call.

Figure 9A:
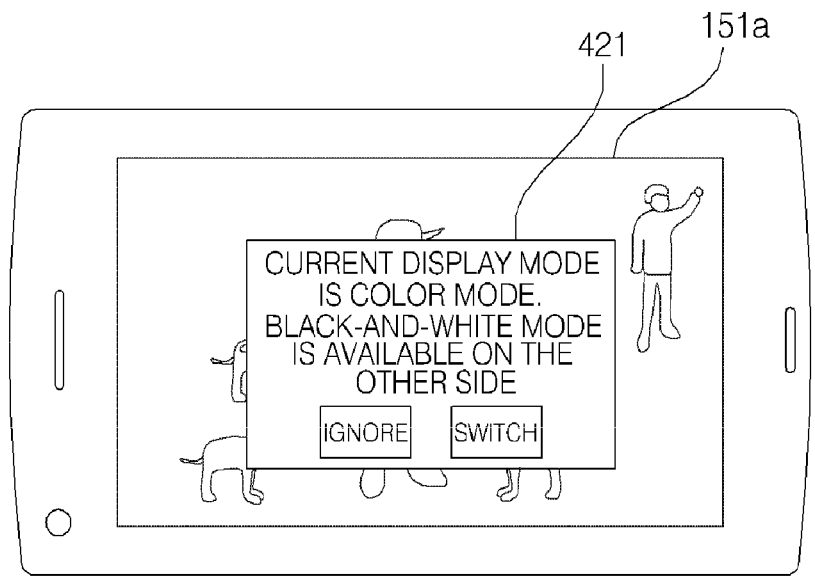
Figure 9B:
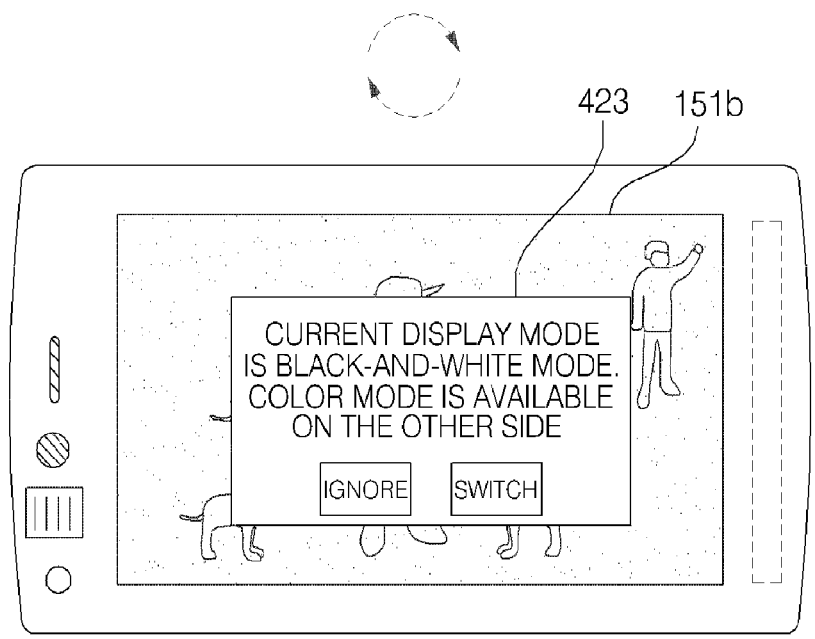

Referring to FIG. 9A, during a camera mode, a preview screen may be displayed on the first display module 151*a*. A message 421 indicating that a current display mode is a color mode may be displayed on the preview screen.

In this case, if the mobile terminal 100 is rotated (FIG. 9B), the mobile terminal 100 may be automatically switched from the color mode to a black-and-white mode, and a message 423 indicating that the current display mode is the black-and-white mode may be displayed on the second display module 151b.

FIG. 10A illustrates a diagram of a screen image displayed on the first display module 151a when an alarm signal is output. If the mobile terminal 100 is rotated (FIG. 10B) when an alarm signal is output, an alarm snooze function may be performed and the output of the alarm signal may be terminated for a predefined amount of time. A screen image related to the alarm snooze function may also be displayed on the second display module 151b.

The alarm signal may initially be output by the first audio output module 153a. However, after the execution of the alarm snooze function, the alarm signal may be output by the second audio output module 153b on the rear case 100A-2 of the mobile terminal 100. That is, the alarm signal may be output by different audio output modules 153 upon the rotation of the mobile terminal 100.

Figure 11B:
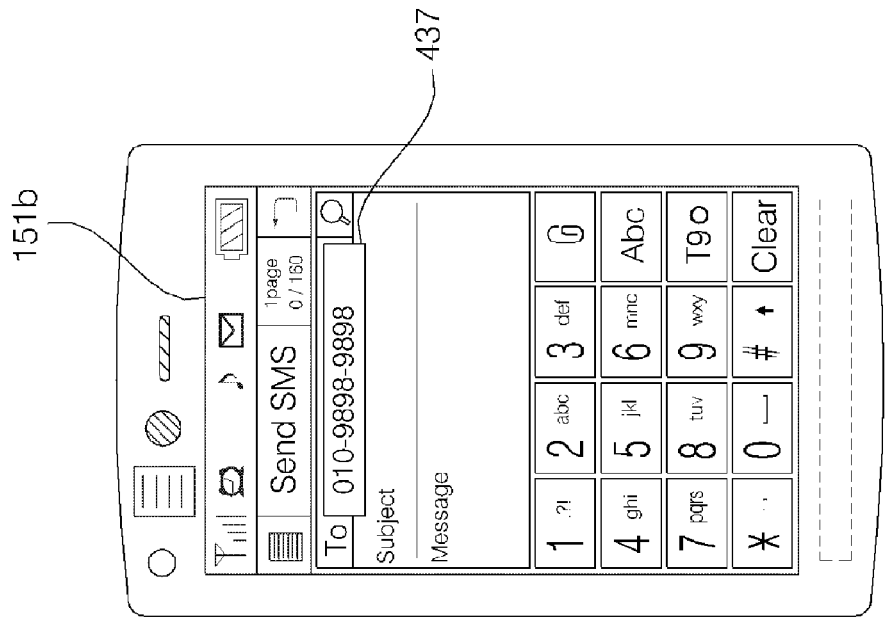
Figure 11A:
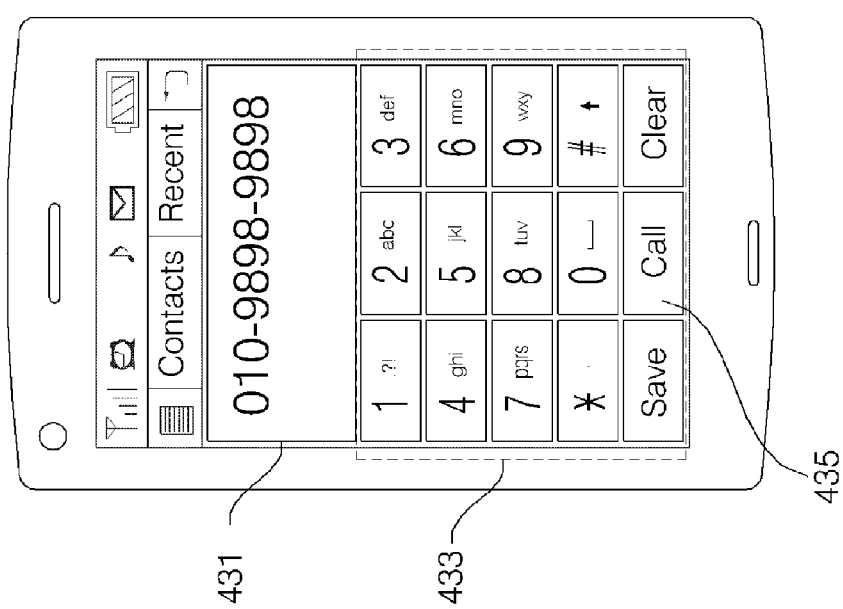

Referring to FIG. 11A, a dialing menu screen may be displayed on the first display module 151a. A phone number input window 433 and a phone number display window 431 may be displayed on the dialing menu screen. A phone number input to the mobile terminal 100 through the phone number input window 433 may be displayed in the phone number display window 431. If the user chooses a 'Call' item (435) when a phone number is displayed in the phone number display window 431, a voice call may be connected to the phone number displayed in the phone number display window 431.

On the other hand, if the mobile terminal 100 is rotated when a phone number is displayed in the phone number display window 431, a menu screen for sending a message to the phone number displayed in the phone number display window 431 may be displayed on the second display module 151b, as shown in FIG. 11B. Thus, the user may send a message to an input phone number 437 using the second display module 151b. Alternatively, a menu screen for sending a file or making a video call to the input phone number 437 may be displayed on the second display module 151b upon the rotation of the mobile terminal 100.

Figure 12B:
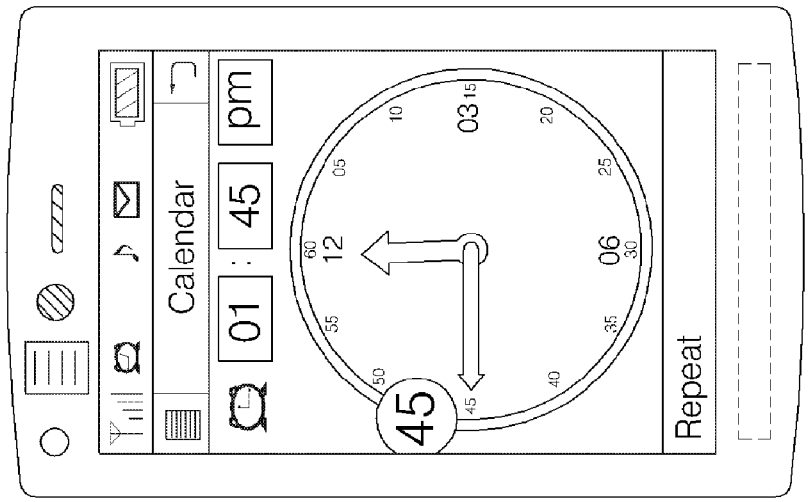
Figure 12A:
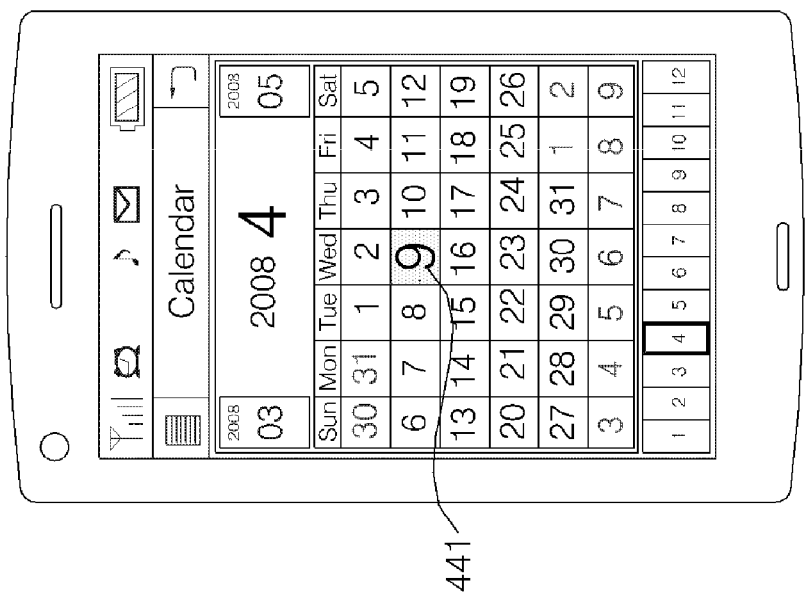

Referring to FIG. 12A, a calendar screen may be displayed on the first display module 151a. If the mobile terminal 100 is rotated (FIG. 12B) when a date 441 is selected from the calendar screen, a menu screen for setting a schedule for the date 441 may be displayed on the second display module 151b.

In this manner, it is possible to control various operations performed by the mobile terminal 100 upon the rotation of the mobile terminal by using the first and second display modules 151a and 151b provided at the front and the rear, respectively, of the mobile terminal. The mobile terminal 100 according to the present invention and the method of controlling a mobile terminal according to the present invention are not restricted to the exemplary embodiments set forth herein. Rather, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to switch a mobile terminal from one operating mode to another operating mode upon the motion of the mobile terminal by using an acceleration sensor capable of measuring the direction of gravitation acceleration. In addition, it is possible to improve user convenience and power efficiency by displaying various screen images using two display modules provided at the front and the rear, respectively, of a mobile terminal and having different properties.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A mobile terminal, comprising:
 a main body;
 a first display positioned on a front surface of the main body;
 a second display positioned on a rear surface of the main body;
 a first speaker associated with the first display and configured to output a first audio signal;
 a second speaker associated with the second display and configured to output a second audio signal;
 a sensor configured to detect a rotation of the mobile terminal, wherein the rotation includes an orientation of the main body of the mobile terminal relative to a primary direction of gravitational acceleration; and
 a controller configured to:
  execute an application associated with audio output during a first state in which the rear surface of the mobile terminal faces down and the front surface of the mobile terminal faces up, wherein the application comprises an alarm application;
  cause the first speaker to output the first audio signal generated by the execution of the application during the first state, wherein the first audio signal is associated with an alarm;
  cause the first display to display a first indicator associated with the execution of the application during the first state;
  cause the first speaker to stop an output of the first audio signal when it is determined based on the rotation detected by the sensor that the mobile terminal is rotated from the first state to a second state in which the rear surface of the mobile terminal faces up and the front surface faces down;
  cause the second display to display a second indicator associated with the stopping the output of the first audio signal during the second state;
  activate a snoozing function of the application when the mobile terminal is rotated from the first state to the second state; and in response to termination of the snoozing function, cause the second speaker to output the second audio signal generated by the execution of the application during the second state.

2. The mobile terminal of claim 1, wherein the alarm application is executed at set alarm time.

3. The mobile terminal of claim 1, wherein the output of the first audio signal continues at least for a preset period of time during the first state when the mobile terminal is not rotated to the second state and no user input is received.

4. The mobile terminal of claim 1, wherein the second indicator comprises a plurality of selectable items, the controller further configured to:
   select one of the plurality of selectable items displayed on the second display in response to a user command.

5. The mobile terminal of claim 4, wherein each of the plurality of selectable items represents a different length of snoozing associated with the snoozing function of the application.

6. The mobile terminal of claim 1, wherein the controller is further configured to:
   stop the output of the second audio signal in response to a user command; and
   resume the stopped output of the second audio signal in a predetermined period of time during the second state without requiring a user input.

7. The mobile terminal of claim 1, wherein the controller is further configured to select the first speaker or the second speaker based on the detected rotation of the mobile terminal.

8. The mobile terminal of claim 1, wherein the controller is further configured to detect the rotation of the mobile terminal based on measurement data received from the sensor indicating that the mobile terminal is rotated more than ninety degrees in an axial direction parallel to a longitudinal direction of the main body of the mobile terminal.

9. A method of controlling a mobile terminal, the method comprising:
   determining an orientation of a main body of the mobile terminal relative to a primary direction of gravitational acceleration by a sensor of the mobile terminal;
   executing an application associated with audio output during a first state in which the rear surface of the mobile terminal faces down and a front surface of the mobile terminal faces up;
   outputting, via a first speaker of the mobile terminal, a first audio signal generated by the execution of the application during the first state;
   displaying a first indicator on a first display provided on a first surface of the mobile terminal during the first state, the first indicator being associated with the execution of the application;
   stopping an output of the first audio signal when it is determined based on the orientation detected by the sensor that the mobile terminal is rotated from the first state to a second state in which the rear surface of the mobile terminal faces up and the front surface faces down;
   displaying a second indicator on a second display provided on a second surface of the mobile terminal during the second state, the second indicator being associated with stopping the output of the audio signal;
   activating a snoozing function of the application when the mobile terminal is rotated from the first state to the second state; and
   in response to termination of the snoozing function, outputting by a second speaker of the mobile terminal a second audio signal generated by the execution of the application during the second state.

10. The method of claim 9, wherein the application comprises an alarm application that is executed at set alarm time.

11. The method of claim 9, wherein the output of the first audio signal continues at least for a preset period of time during the first state when the mobile terminal is not rotated to the second state and no user input is received.

12. The method of claim 9, wherein the second indicator comprises a plurality of selectable items, the method further comprising:
   selecting one of the plurality of selectable items displayed on the second display in response to a user command.

13. The method of claim 12, wherein each of the plurality of selectable items represents a different length of snoozing associated with the snoozing function of the application.

14. The method of claim 9, further comprising:
   stopping the output of the second audio signal generated by the execution of the application during the second state;
   resuming the stopped output of the second audio signal in a predetermined period of time during the second state without requiring a user input.

15. The method of claim 9, further comprising:
   selecting the first speaker or the second speaker based on the detected rotation of the mobile terminal.

16. The method of claim 9, further comprising:
   detecting the rotation of the mobile terminal based on measurement data received from the sensor of the mobile terminal indicating that the mobile terminal is rotated more than ninety degrees in an axial direction parallel to a longitudinal direction of the main body of the mobile terminal.

* * * * *